Feb. 24, 1925.

A. WOODWARD 1,527,290

MEANS EMPLOYED IN THE INSTRUCTION IN THE ART OF ELOCUTION

Filed Aug. 31, 1921    2 Sheets-Sheet 1

A VISION of the PAST
Analyzed for Poise,
Position and Gesture

*The Past rises before me like a dream*

Again we are in the midst of preparation for the great struggle for national life.

*I hear the sounds of preparation;*

FIG. 1.

A VISION of the PAST.
Analyzed for Pause.

Key to signs on the Text;
　Slight Pause　—
　Medium Pause　=
　Long Pause　≡

The past_rises_ before me_like a dream._Again_we are in the midst of preparation_for the great struggle_

FIG. 2.

A VISION of the PAST
Analyzed for Inflection.

Key to signs on the Text:
　Falling Inflection　\
　Rising Inflection　/
　Circumflex down -up　V
　Circumflex up-down　∧

The past rises before me like a dream. Again we are in the midst of preparation for the great struggle

FIG. 4.

A VISION of the PAST.
Analyzed for Emphasis and Stress.

Key to signs on the Text:
　Light Emphasis　———
　Medium Emphasis　=
　Strong Emphasis　≡
　Stress(degrees) · • ●

The past rises before me like a dream. Again we are in the midst of preparation for the great struggle

FIG. 3.

A VISION of the PAST
Analyzed for Volume.

Key to signs on the Text:
　Soft
　Normal
　Loud
　Very Loud

The past rises before me like a dream. Again we are in the midst of preparation for the great struggle

FIG. 5.

Inventor
Arthur Woodward
by Joseph F. O'Brien
His Attorney

Feb. 24, 1925.

A. WOODWARD 1,527,290

MEANS EMPLOYED IN THE INSTRUCTION IN THE ART OF ELOCUTION

Filed Aug. 31, 1921   2 Sheets-Sheet 2

A VISION of the PAST
Analyzed for Time.

Key to signs on the Text;
  Slow
  Normal
  Fast
  Very fast

The past rises before me like a dream. Again we are in the midst of preparation for the great struggle

FIG. 6.

A VISION of the PAST
Analyzed for Pitch.

Key to signs on the Text:
  Normal
  Above line-High Pitch
  Below line-Low Pitch The past rises before me like a dream. Again we are in the midst of preparation for the great struggle

FIG. 7.

A VISION of the PAST
Analyzed for Quality.

Key to signs on the Text;
  The descriptive words under
the  Text indicate the quality
of voice to be used, etc.

The past rises before me like a
slightly sad.........................
dream.  Again we are in the midst of
.........
preparation for the great struggle
                  vigorous manly tone....

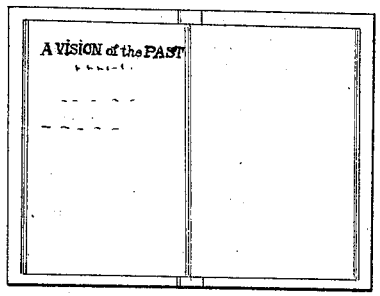
Inventor
Arthur Woodward
by Joseph F. O'Brien
his Attorney

Patented Feb. 24, 1925.

1,527,290

UNITED STATES PATENT OFFICE.

ARTHUR WOODWARD, OF ISLIP, NEW YORK.

MEANS EMPLOYED IN THE INSTRUCTION IN THE ART OF ELOCUTION.

Application filed August 31, 1921. Serial No. 497,116.

*To all whom it may concern:*

Be it known that ARTHUR WOODWARD, citizen of the United States, residing at Islip, Long Island, in the county of Queens and State of New York, has invented certain new and useful Improvements in Means Employed in the Instruction in the Art of Elocution, of which the following is a specification.

This invention has for its object to furnish a system of instruction in the art of elocution in all of its branches, including public speaking, recitation, dramatic work and the like in which text books embodying preliminary instructions in the fundamental elements of public speaking and of judiciously selected example speeches and addresses are supplemented by expertly rendered phonograph records of the printed speeches and addresses thereby enabling the student, while reading the printed address to follow and study the phonograph reproduction of the original and correct rendition thereof, and in this manner become familiar with the correct use of the various elements of speech such, for instance, as "pause," "emphasis," "inflection," "volume," "time," "pitch" and "quality."

A further object is to analyze, by the use of novel and quickly distinguished signs, the various printed compositions for the fundamental elements above mentioned whereby the student may readily acquire proper use of the various elements in the oral delivery of the typical printed composition.

A still further object resides in the association with the text of the compositions of illustrations depicting correct and typical "position," "poise," and "gesture," the latter constituting the three essential physical constituents of delivery.

In the accompanying drawing wherein an approved embodiment of the invention is illustrated:—

Figure 1 is a view of a portion of a printed sheet on which a selected composition is analyzed for "poise," "position," and "gesture."

Fig. 2 is a similar view of the portion of another page of the book where the same composition is analyzed for the element of "pause."

Fig. 3 is a similar view showing the composition analyzed for the element of "emphasis" and "stress."

Fig. 4 is a similar view of a composition analyzed for the element of "inflection."

Fig. 5 is a similar view of the composition analyzed for "volume."

Fig. 6 is a similar view of the printed composition analyzed for the element of "time."

Fig. 7 is a similar view of the composition analyzed for the element of "pitch."

Fig. 8 is a similar view of the composition analyzed for the element of "quality."

Fig. 9 represents a plan view of a record on which a certain composition is recorded, a page of the book relating to this composition being also illustrated.

Fig. 10 is a plan of another style of record in which is recorded, as indicated by the title, exercises for voice inflection and addresses.

In the present system of instruction in the art of speaking, several fundamental parts of speech are considered. They comprise a number of well defined essentials which for the purpose of clearness and understanding are termed "elements" as follows:—

1. "Pause", 2—"emphasis", 3—"inflection", 4—"volume", 5—"time"—6, "pitch" 7—"quality".

In addition to the foregoing elements there must also be considered the three constituents of delivery, namely, "poise", "position", and "gesture".

For convenience and effectiveness in the actual use of a practical embodiment of the system of instruction, whether embodied in book form or otherwise, the physical constituents of delivery and the various elements of speech are preferably presented to the student in the following order.

First, "poise", "position" and "gesture"; second, "pause"; third, "emphasis" and "stress"; fourth, "inflection"; fifth, "volume"; sixth, "time"; seventh, "pitch", and eighth, "quality", and, for the sake of simplicity and uniformity, the same composition is used in the primary step of instruction as indicated by the extracts from a composition which has been selected for illustration in the accompanying drawing and this composition is successively analyzed for the several elements of speech in the order above given.

Referring to Figure 1 of the drawing, there is illustrated a portion of a printed composition which as indicated by an appropriate heading is analyzed for "poise", "position" and "gesture". For assisting the student in acquiring appropriate gestures in the delivery of a speech, certain signs consisting of pictures representative of proper "poises" and "gestures" are utilized which are associated with the printed record of the composition and so arranged with respect thereto that the student may readily locate the proper point in the oral rendition of the composition at which the gesture should be made. For illustrative purposes, an extract from the composition entitled "A vision of the past" has been used and referring to Fig. 1, there are shown suggestions of appropriate gestures to be used for enforcement of the language of the composition. For instance, under the picture at the left of Figure 1, is printed the following note: "This first gesture is made with the eyes partly closed to suggest seeing at a distance, chin tilted upwards, hands at side", while under the picture at the right of said figure is printed "Listening attitude, a slight alertness of the right hand". The passages of the composition which accompany each illustration are preferably printed in different kinds of type, for instance, in italics and in Roman type. The passages which are to be spoken with the "gesture" represented by the accompanying illustration are printed in italics, whereas the passages of the text which require no gesture are printed in roman type, and in this way the student may readily distinguish the salient points in the composition which require the enforcing effect produced by appropriate gesture.

Fig. 2 represents a part of the same composition analyzed for the element of "pause". For indicating the points in the composition which require "pause" and furthermore for indicating the extent for such "pause", "pause" signs are provided. As suggested in the key to the "pause" signs which precedes the text of the composition, a single short line occurring between two words indicates that a slight "pause" should be used, the marks of two lines indicating a "pause" of medium length, and three lines, a "pause" of long duration.

Fig. 3 discloses the composition analyzed for the element of "emphasis" and "stress" as indicated by the key to the signs. The single line occurring under one or more words indicates that light emphasis should be placed upon the pronunciation of the word, whereas the presence of two lines beneath a word or words indicate the use of medium emphasis. Likewise, three lines indicate the use of strong emphasis. The "stress" signs consist in the use of dots beneath the word or words to be stressed, the size of the dot being indicative of the degree of stress to be used.

Analysis of the composition for the element of inflection is suggested in Fig. 4 wherein the series of signs is provided for indicating the kind of inflection to be employed. As indicated in the key to the signs, a line extending inwardly and upwardly toward the center of a word at the end of a sentence or phrase indicates falling inflection, while the line inclined in the opposite direction indicates the use of rising inflection. A V-shaped sign indicates use of circumflex inflection, down-up, and an inverted mark indicates circumflex inflection, up-down. In the key to the analysis of the composition for the element for "volume", as indicated in Fig. 5, the existance of the double lines occurring under the words of the composition indicates the use of a soft voice of small volume, while the greater spacing of these lines and the angle of their convergence and divergence indicates a greater volume and rapidly increasing or diminishing volume.

In the analysis of the composition for the element "time" as suggested in Fig. 6, a wavy or serpentine line is used, the frequency of the convolutions or curves of which indicate the speed at which the words in the various passages of the composition should be uttered.

For indicating the proper pitch of the voice to be used in the delivery of the speech, a heavy line is used beneath the lines of the text and a relatively small line by which the variations in the main pitch line may be distinguished is preferably employed in connection therewith. As will be readily understood, deviations of the heavy pitch line above the small line indicate higher pitch, whereas deviations of the main pitch line below the finer line indicate lower pitch.

The quality of the voice is indicated by notes printed in small letters below the line of the text and dotted lines extending to the right of such notes indicate how far each variation of the quality of the voice is to be continued. Where there is no indication, a natural conversational tone is to be employed.

The system above described including the analysis of composition for the various elements of speech is supplemented by records adapted to be reproduced on a phonograph and the records are preferably made by having artists render the compositions appearing in the printed matter forming part of the system. For instance, one of the records may be that of the rendition of the composition "A vision of the past." To aid the student to determine the point in the printed record wherein this composition occurs, the volume and page is preferably printed on the record as indicated in Fig. 9. In this way, the student is enabled to read the text and analyze the compositions, while at the same time the sound record is reproduced.

In Figure 10 is shown another type of record which may be provided for the assistance of the student in acquiring the proper use of inflection and the latter record may also embody various other speeches for purposes of study.

I claim as my invention:

1. A system of instruction in elocution comprising a printed page or a succession of such pages containing a written composition, the composition being repeated on the same or a succession of pages, the composition being accompanied by arbitrary symbols to indicate the proper poise and positions of the speaker during recitation of the composition and the gestures to accompany the recitation of the composition and when they are to be made, and the repetition being accompanied by symbols to indicate the proper pauses between certain words of the composition during the recitation.

2. A system of instruction in elocution comprising a printed page or a succession of such pages containing a written composition, the composition being repeated on the same or a succession of pages, the composition being accompanied by representations of a speaker having the correct poise for that part of the composition in proximity to the representation, the representation of the composition being accompanied by symbols to indicate the proper pauses between certain words of the composition during the recitation.

3. A system of instruction in elocution comprising a printed page or pages containing a written composition, the composition being repeated on the same or a succession of sheets, the composition and repetition being accompanied by arbitrary symbols to indicate proper poise and positions of the speaker during recitation of the composition, one repetition being accompanied by symbols to indicate the proper pauses between certain words of the composition during recitation and another repetition of the composition being accompanied by symbols to indicate the proper emphasis and stress to be placed upon certain words of the composition during the recitation.

4. A system of instruction in elocution as claimed in claim 3 accompanied by still another repetition of the composition which is accompanied by symbols to indicate the proper inflections of the voice of the speaker that should be placed upon certain words of the composition.

5. A system of instruction in elocution comprising a printed page or a succession of such sheets containing a written composition, the composition being repeated a number of times on the same or a succession of pages, the composition being accompanied by symbols to indicate the proper pause or position of the speaker during recitation of the composition, one of the repetitions of the composition being accompanied by symbols to indicate the proper pauses between certain words of the composition, another repetition of the composition being accompanied by signs to indicate the proper emphasis and stress to be placed on certain words of the composition, another repetition of the composition being accompanied by signs to indicate the proper inflection of the voice of the speaker in rendition of the composition, and still another repetition of the composition being accompanied by signs to indicate the volume of sound that should be used in certain words of the composition.

6. A system of instruction in elocution as set forth in claim 5 in which there is still further repetition of the composition accompanied by symbols to indicate the amount of time that should be used in speaking certain lines or phrases of the composition.

7. A system of instruction in elocution as set forth in claim 5 in which there is added another repetition of the composition accompanied by the proper signs to indicate the pitch of the voice in the rendition of certain words or lines of the composition.

In testimony whereof I affix my signature.

ARTHUR WOODWARD.